United States Patent
Igel, V

(10) Patent No.: US 8,899,873 B2
(45) Date of Patent: Dec. 2, 2014

(54) MULTI-PURPOSE PUMPED STORAGE FACILITY

(71) Applicant: Windmarket LLC, Reynoldsburg, OH (US)

(72) Inventor: George J. Igel, V, Reynoldsburg, OH (US)

(73) Assignee: Windmarket, LLC, Reynoldsburg, OH (US)

( * ) Notice: Subject to any disclaimer, the term of this patent is extended or adjusted under 35 U.S.C. 154(b) by 0 days.

(21) Appl. No.: 13/798,262

(22) Filed: Mar. 13, 2013

(65) Prior Publication Data

US 2014/0270965 A1    Sep. 18, 2014

(51) Int. Cl.
*E02B 9/02* (2006.01)
*F03B 13/06* (2006.01)

(52) U.S. Cl.
CPC .. *E02B 9/02* (2013.01); *F03B 13/06* (2013.01)
USPC .......................................................... 405/53

(58) Field of Classification Search
USPC .......................................................... 405/53
See application file for complete search history.

(56) References Cited

U.S. PATENT DOCUMENTS

| | | | |
|---|---|---|---|
| 3,214,915 A | 11/1965 | Weibel | |
| 4,010,614 A * | 3/1977 | Arthur | 60/641.15 |
| 4,110,980 A * | 9/1978 | Foulke | 60/325 |
| 4,132,901 A | 1/1979 | Crausbay | |
| 5,389,821 A | 2/1995 | Moulliet | |
| 6,000,880 A * | 12/1999 | Halus | 405/52 |
| 6,861,766 B2 * | 3/2005 | Rembert | 290/43 |
| 7,003,955 B2 | 2/2006 | Davis | |
| 7,153,060 B1 * | 12/2006 | Bennion | 405/75 |
| 7,656,050 B2 * | 2/2010 | Riley | 290/43 |
| 7,866,919 B2 | 1/2011 | Miller | |
| 8,643,206 B2 * | 2/2014 | Ekern | 290/53 |
| 2005/0034452 A1 * | 2/2005 | Davis | 60/398 |

* cited by examiner

*Primary Examiner* — Tara M. Pinnock
(74) *Attorney, Agent, or Firm* — Jason H. Foster; Kremblas & Foster

(57) ABSTRACT

A pumped storage facility combined with at least a seating area constructed on a bank of an upper reservoir facing a lower reservoir. The lower reservoir includes a track around the shore thereof so that spectators in the seating area can view the track. A performance area is constructed adjacent the track along the lower reservoir, and can be built over the water on piers if needed. Thus, racing events can take place on the track and be viewed by spectators in the seating area. A parking lot drains water into the lower reservoir.

7 Claims, 2 Drawing Sheets

US 8,899,873 B2

MULTI-PURPOSE PUMPED STORAGE FACILITY

BACKGROUND OF THE INVENTION

The invention relates generally to a pumped storage facility, and more specifically to a pumped storage facility that includes other features that cooperate with the pumped storage facility to make it economically feasible to construct and operate the facility.

The availability of power when needed is a major drawback to the production and use of any form of energy, but particularly alternative energy. The requirement that one match the inconsistent availability of alternative energy-produced power with production from a standard power plant, or Guaranteed Source of Power ("GSOP"), is also a disadvantage. A GSOP is typically a coal-burning power plant, nuclear energy plant, natural gas burning plant, or any other conventional energy-producing source of power.

If the wind is blowing or the sun is shining, alternative power is available if one has windmills or photovoltaic cells in operation. However, if the blowing wind or the shining sun stops abruptly, a GSOP must be operating to meet demand that typically does not start or stop abruptly. When the GSOP is operating and the wind-based or sun-based power production facilities start producing, there is a dilemma about what to do with excess power being produced. The energy provider must decide whether to slow power production from the GSOP with the risk that the alternative source may suddenly slow or stop altogether, or maintain production and waste energy.

Pumped storage facilities are currently used to help balance production with demand, especially during peak power demand periods on very hot days (when cooling power demands are highest) and very cold days (when heating power demands are highest). Pumped storage facilities have reservoirs, such as ponds or lakes, at two different elevations, and the ponds or lakes are connected to one another through one or more large pipes or other water-conveying structures through or over which water can flow or be pumped. Rather than shutting a power plant down completely when demand for power production is small, excess power can be used to pump water from the lower reservoir to the upper reservoir. When demand for power climbs, the power used to run the pumps is reduced to accommodate the demand. At a higher level of demand for power, water is no longer pumped. Finally, when demand increases further, water can be released to flow from the upper reservoir through a hydroelectric transducer to produce electricity to meet the higher demand. If demand subsequently drops, the flow of water that produces energy can be halted. At any time that demand falls below GSOP power production, any excess power generated by the GSOP can be diverted into pumping water from the lower pond into the upper pond. Thus, hydroelectric power production supplements conventional energy sources by using a two-pond system to "store" and "release" the potential energy of water stored at elevation as needed. As the GSOP is no longer able to keep up with demand, a clean source of power supplies the energy demand. If demand abruptly or temporarily drops, this power is abruptly or temporarily diverted into pumping water from the lower pond into the upper pond.

If a pumped storage facility can balance the "peaks and valleys" of the multiple sources of clean power production against the fluctuating demand during the daily cycle, then the GSOP can operate at its most efficient rate, and power supply can be matched to public demand. However, because the construction costs for typical pumped storage facilities are substantial, most pumped storage facilities rely on a natural source of water, such as a river or a lake, to supply the water. This restricts the available sites for the facility. The need therefore exists for a pumped storage facility design that can be incorporated into virtually any geographic or demographic area.

BRIEF SUMMARY OF THE INVENTION

The invention is a pumped storage facility with additional features that cooperate to make the facility efficient and cost-effective. The hillside of the upper pond incorporates a seating arrangement in the manner of stadium seating to promote cash-generating activities that support the initial and ongoing costs of the facility. The area around the lower pond is a sports track with a widened region in front of the seating area. The track is constructed above the high water level of the lower pond, and allows spectators in the seating to watch the entire track. The track can accommodate automobiles, horses, humans and any other track racing or other activity that requires a looped track. The widened area in front of the seats can be used for non-track activities, such as concerts and it can serve as "pits" for an automobile race or it can store horse trailers for horse races. In a preferred embodiment, the widened area is about 150 feet wide, but this size is not critical.

Water run-off flows into the lower pond from an adjacent paved parking lot to provide the water supply necessary to keep the reservoirs filled despite evaporation losses. In one embodiment, tarps or other covers extend over one or both reservoirs to limit evaporation losses of water.

The bottom of the upper reservoir is at an elevation relative to the full elevation of the lower reservoir to optimize the head available to efficiently operate the hydroelectric power generation facility. Hydroelectric power generation may be carried out with an apparatus as simple as a large diameter wheel with multiple buckets attached. As the water flows out of the pipe from the upper reservoir into the buckets, the additional weight turns the wheel to produce the torque necessary to drive the generator. The water pours out of the buckets when they reach the bottom, and drains into the lower lake for storage until pumped up to the upper reservoir.

Construction costs for such a facility are staggering, and typically cannot be justified based solely on reduced environmental pollutants and peak power availability. The invention discussed herein incorporates a self-contained facility that can be placed on property that is remote, as long as high power transmission lines are accessible and transportation to and from the facility is available. Rolling terrain near a major highway would help reduce construction costs, but a large flat field or abandoned strip mine would also suffice. Excavation of the lower reservoir generates fill necessary to build the upper reservoir. Designs with two reservoirs adjacent to each other minimize the distance the dirt must be moved and reduces costs.

Because the hillside of the upper reservoir incorporates a structured seating arrangement, one can use the facility as a concert venue and/or sports arena. A stage may be built on piers on the edge of the lower reservoir. Paying concert-goers have a seat on the hillside seating area with an unobstructed view of the stage. This would operate as an outdoor amphitheater. Restrooms and concession vending areas are built under the seating area at strategic locations, and the cost of these may be paid for with long term lease contracts.

Water run-off from one or more parking areas is critical to provide the water supply necessary to fill the reservoirs and keep them supplied due to evaporation losses. It may be necessary to provide a tarp to limit evaporation loss during periods of little rain, or in geographic locations with little rain. Storm water contains less sediment than the typical water from a river or lake source for a pumped water storage facility, and would be less abrasive on pumps. It would also require less routine maintenance to remove this sediment from the bottom of either or both reservoirs.

The facility may also include options such as a race track around the inside of the top of the slopes of the lower reservoir. The slopes could be designed to match the track of a racetrack similar to the Indianapolis 500, and seating for 100,000 or more could be constructed on the outside slope of the upper reservoir. Such a racetrack would be constructed above the high water level of the lower reservoir.

Once the racetrack is accepted or sanctioned by the racing community, a number of hotels, restaurants, and bars will begin purchasing leases on some of the surrounding real estate, bringing additional sources of revenue to justify the cost of construction and operation. A casino would also be a good match for the track and grandstand facility, putting a view over and onto the track as an attraction for gamblers, automobile racing fans, and horse racing fans.

Depending on the climate where the facility is constructed, the back slopes of the upper reservoir could be equipped for skiing, and moguls and designed trails would make it a course for skiers during the winter when concerts and other outdoor activities are not taking place.

The top of the dike around the upper reservoir could be paved and fenced off to serve as a landing strip and taxiway for airplanes and helicopters, attracting individuals who wish to bypass the congestion of the motoring public. Alternatively, the top of the upper reservoir may serve as a good location for windmills to produce clean alternative energy.

Another option would be the construction of an executive golf course around the side of the upper reservoir facing away from the lower reservoir, and additional seating could be constructed on the slope of the upper reservoir facing the golf course to allow prime viewing of a professional or college golf tournament.

In the right location, combining this facility with an amusement park or a zoo could also serve as additional paved areas to collect rainwater and divert it to a lower reservoir for pumping to the upper reservoir. In all cases, a paved parking area is necessary where a creek, river, or lake is not available to provide the water supply.

Figure 1:
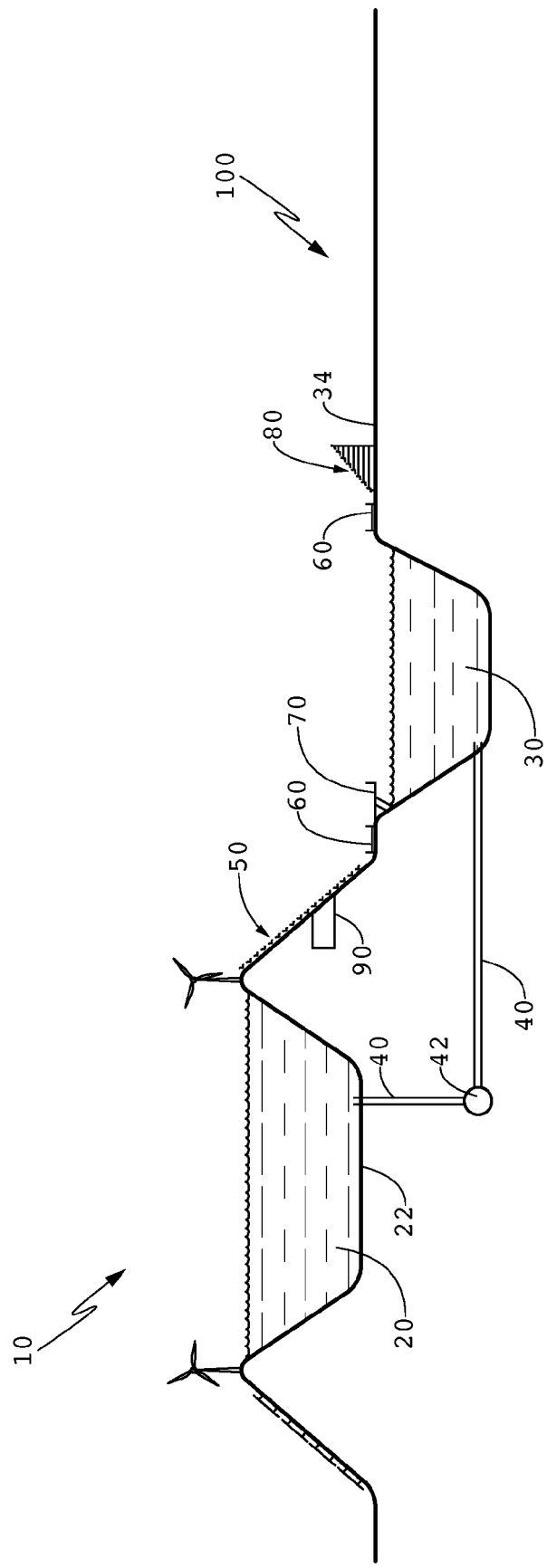
FIG. 1 is a side view illustrating a preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

FIG. 1 shows a preferred pumped storage facility 10 having a first reservoir, such as the upper pond 20, and a second reservoir, such as the lower pond 30. While the terms "reservoir" and "pond" are used herein, any large container of water similar to a pond, reservoir, lake, sea or any other body of water can be considered equivalent. The upper pond 20 and the lower pond 30 are located at different elevations from one another such that water flowing from the upper pond 20 tends to flow downward toward the level of the lower pond 30 under the force of gravity alone. Similarly, water flowing out of the lower pond 30 does not tend to flow toward the upper pond 20 under the force of gravity alone.

A conduit 40 connects the upper pond 20 to the lower pond 30. In a preferred embodiment, the conduit 40 is a large pipe that is many feet in diameter, and the pipe can be made of any material, including without limitation, steel, plastic or concrete. Water in the upper pond 20 can flow through the conduit 40 to the lower pond 30 under the force of gravity alone when one or more conventional valves (not illustrated) otherwise blocking the conduit 40 are opened. However, as with a conventional pumped storage facility, water will not flow from the lower pond 30 to the upper pond 20 through the conduit unless it is pumped. As with a conventional pumped storage facility, a hydroelectric transducer 42 is preferably interposed along the length of the conduit 40, and when it is powered, as described below, it pumps water from the lower pond 30 to the upper pond 20 through the conduit 40. Furthermore, the transducer 42 may operate as a hydroelectric generator when driven by the force of water passing through it flowing from the upper pond 20 to the lower pond 30. Thus, the hydroelectric transducer 42 can pump water from the lower pond 30 to the upper pond 20 when electrically powered, and can produce electrical power when water flows under the force of gravity through the transducer 42 from the upper pond 20 to the lower pond 30. Of course, it is also possible to have separate pumps, generators and conduits.

The relationship of the components of the facility 10 shown in FIG. 1 is illustrative and is not intended to be limiting. For example, the upper pond 20 is illustrated with the floor 22 thereof at approximately the same level as the shore (maximum upper level) 34 of the lower pond 30. Nevertheless, the floor of the upper pond and the shore of the lower pond can be spaced a greater vertical distance from one another. Furthermore, the conduit 40 is shown extending from the lowest level of the upper pond 20 to the lowest level of the lower pond 30. This configuration is not critical, because the conduit might just as well extend from the sides of the ponds, midway between the floors and the shores of the ponds 20 and 30, depending on whether there is sediment in the water and other factors. Alternatively, in addition to the conduit 40 alone, an open trough can allow water to flow from the upper pond 20 to the lower pond 30 past a hydroelectric turbine that generates power, while the conduit and transducer 42 are used to pump water up to the upper pond 20. Still further, the ponds 20 and 30 are shown in cross section in FIG. 1 having a proposed shape and proportion of floor and sidewalls. These can differ depending on whether the floor and sidewalls are formed of soil, clay, gravel, concrete, fiberglass, steel, aluminum or any other material known to contain water. The configuration of the floors and sidewalls of the ponds 20 and 30 can be modified as will be understood by the person of ordinary skill from the description herein.

One important feature of the facility 10 is the seating area 50 positioned on the angled side of the bank of the upper pond 20. The seating area 50 preferably has seats, which may include bleachers, chairs, seats, benches or any other human-seating structure resting upon, attached to, or molded into the angled side of the bank. It is contemplated that there may be concrete or plastic that rests against the earth forming the bank and out of which is molded human seats and/or seating structures. In another embodiment, the seating area 50 may have stadium seats, such as the type commonly found in sports arenas and outdoor venues used for concerts, sports events or other gatherings. The seats may be formed on or in the bank so that their human occupants are positioned to comfortably and naturally view downhill toward the lower pond 30. The seats formed in the seating area 50 can be removable and modular, so that during different seasons or events, different seats can be installed to suit particular anticipated occupants. Such seats may cause their occupants to view directly downhill, or the seats may be angled slightly to form a parabola so that the occupants focus on a single point, small area or stage centered downhill from the seating area 50. The reason for this will become apparent below.

At least a portion of the shore of the lower pond 30, and preferably the entire loop of the shore, preferably has a track 60 formed on it. The track 60 is preferably constructed above the high water level of the lower pond 30, and allows spectators in the seating area 50 to view the entire track 60. The track 60 may be formed of conventional track material with a conventional track width and angle relative to horizontal. It is contemplated that the upper surface of the track 60 may be made of loose particulate, elastomeric granular material held together with a flexible resin, asphalt, concrete, or any other material of which tracks used for the purposes described herein are conventionally constructed. The shore of the lower pond 30 is preferably horizontal, but may be "banked" at an angle to allow for better viewing by people in the seating area 50. Furthermore, the shore can be "banked" at an angle all the way around so that vehicles moving at high rates of speed can maintain sufficient frictional engagement with the track to remain firmly on the track. Alternatively, only the corners or the shorter ends of the track may be banked. The track can accommodate vehicle races (automobiles, motorcycles, trucks), animal races (horses, dogs, humans) and any other race, demonstration, event or activity that requires or can use a looped track.

A performance area 70 is preferably constructed on the same level as the track 60 in front of the seating area 50, and extending about as long at the seating area 50, although this is not critical. The performance area 70 is preferably substantially wider than the track 60, and can be 20 to 300 feet wide, depending on the availability of space. It is contemplated that the performance area 70 may also be 50, 100, 150, 200 or 250 feet wide. The performance area 70 can be used as a stage for concerts, sports events or performances that do not require a looped track. Such events include, but are not limited to, "smash up derbies" and tractor pulls, football games and soccer matches, battle reenactments and other similar events that are commonly viewed by an audience. The performance area 70 can also serve as space for "pits" in which automobile racing crews keep their supplies during a race taking place on the track 60, or for horse trailers during horse races. Furthermore, the performance area 70 can store tractor-trailer rigs and other vehicles and supplies used to haul and store supplies for concerts taking place in front of the seating area 50. It will become apparent that any type of surface, including artificial turf, earthen mounds for motocross exhibitions, or any other surface can be constructed on the performance area 70. The performance area 70 can alternatively be used for fairs and festivals, with food vendors, temporary buildings and other amusements placed thereon. Additional seating, such as portable bleachers, can be installed in the performance area 70 to view the track 60. If there is insufficient space on the ground in front of the seating area 50, cantilevered platforms can be constructed above the water of the lower pond 30 as shown in FIG. 1. Of course, if the lower pond 30 is large enough, skiing, boating and other water sports events, races and demonstrations can be performed on the water of the lower pond 30 and viewed by people in the seating area 50 and/or people in the performance area 70, with or without additional seating constructed in the performance area 70.

There are many features that are contemplated as being added to the preferred embodiment described above. For example, bleachers 80 or other elevated seating is contemplated for construction on the side of the lower pond 30 opposite the seating area 50. Of course, such bleachers could be constructed around the entirety of the track 60. Still further, restaurants, concession stands and other human-accessible dwellings 90 may be constructed in the bank of the upper pond 20 in a conventional manner, and such dwellings 90 are preferably accessible from the seating area 50, much like in conventional sports arenas.

Depending on the climate where the facility 10 is constructed, the sloped bank of the upper pond 20 that faces away from the seating area 50, along with any other sloped surfaces of the upper and lower ponds 20 and 30, could be equipped for snow skiing. This slope could include moguls constructed and trails designed to make it an interesting course for all skiers during the winter when other outdoor activities are not taking place on the track and seating area 50. A conventional chair lift can be installed to lift riders to the top of the slope.

The top of the bank around the upper pond 20 may be paved and fenced off to serve as a landing strip and taxiway for small and mid-size airplanes and helicopters, thereby attracting individuals with such vehicles. If a runway or taxiway is not constructed, the top of the upper reservoir may serve as a location for windmills to produce clean alternative energy. An executive golf course can be constructed around the back side of the upper reservoir (opposite the seating area 50), and additional seating can be constructed on the back slopes to allow viewing when a golf tournament occurs.

It is preferred that one or more paved areas, such as the parking lot 100, may be constructed adjacent the lower pond 30. This allows the motoring public access to the track 60 and seating area 50. It is important to note that the parking lot 100 is preferably constructed using conventional sewer drains and tiles that empty into the lower pond 30. Thus, rain that falls onto the parking lot 100 empties into the lower pond 30 as runoff. This allows a substantial amount of any rain that falls near the ponds 20 and 30 to replace water lost due to evaporation and other uses. A tarp or cover over one or both, and over all or part, of the ponds 20 and 30 is also contemplated to limit evaporation loss.

Although only one side of the lower pond 30 is shown paved, it is of course contemplated that the entire area surrounding the lower pond could be paved, depending upon the surrounding terrain. Furthermore, although it is not possible in the embodiment shown in FIG. 1, if the terrain permits, any area surrounding the upper pond 20 can be constructed to direct rainwater runoff into the upper pond 20. Such a configuration would have the additional advantage of providing "free energy" by depositing the water in the upper pond 20 so that it can be turned into electrical energy merely by opening the valves and operating the hydroelectric transducer 42. Although it is preferred for the paved area to be adjacent the upper pond 20 or lower pond 30, a person of ordinary skill will understand that the paved area could be remote from either pond so long as water therefrom drains to one of the ponds.

Although a hydroelectric transducer 42 is shown that both generates power during one set of circumstances and pumps water uphill during a different set of circumstances, the hydroelectric power generation facility can be any other known water-powered, power-generating apparatus. This can be as simple as a large diameter wheel with multiple buckets attached in the manner of a grist mill wheel. As the water flows out of a pipe or trough from the upper reservoir into these buckets, the additional weight turns the wheel to produce the torque necessary to drive a generator. The water then pours out of the bucket when it reaches the bottom, and drains into the lower reservoir for storage until pumped back up to the upper reservoir.

Figure 2:
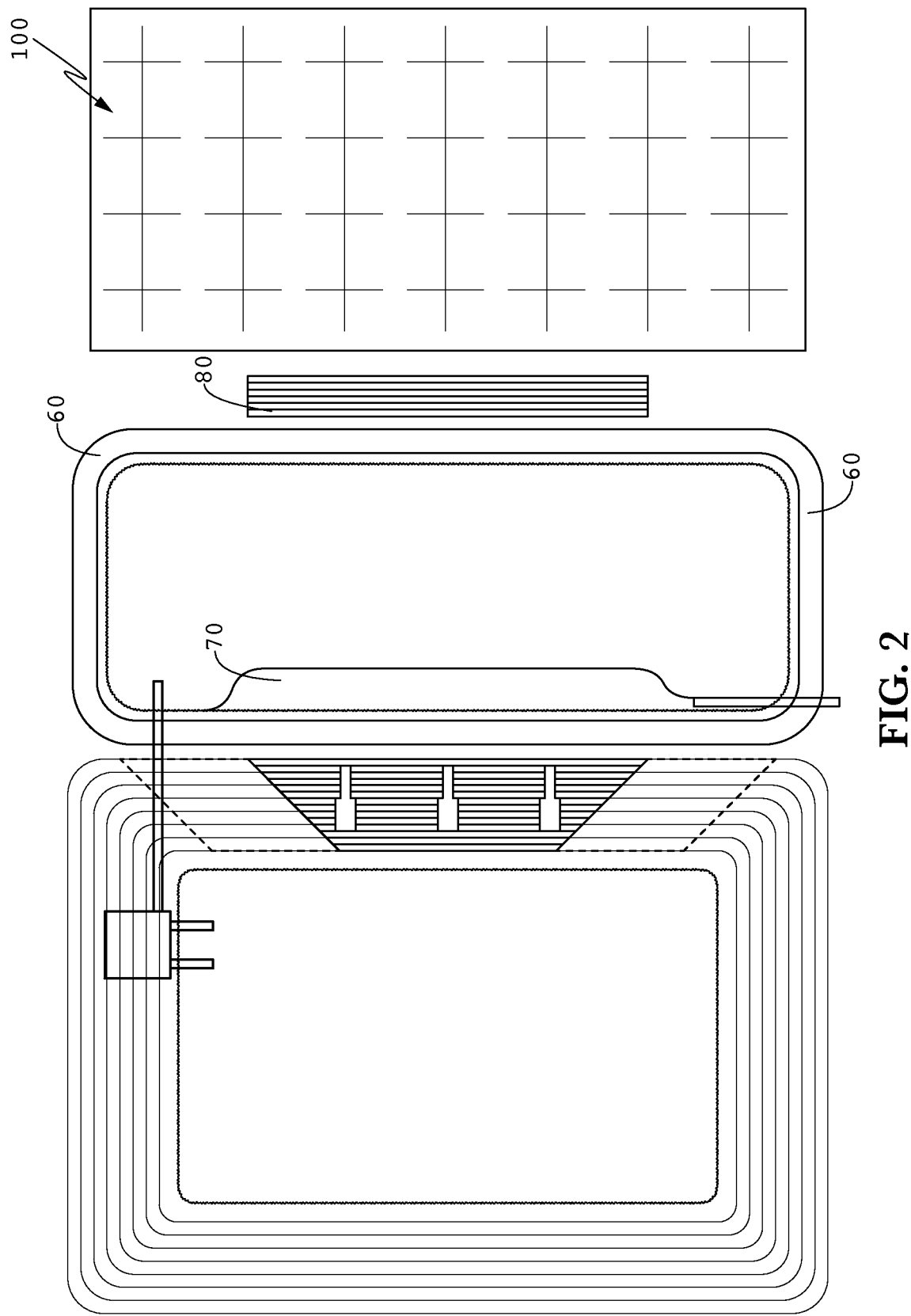
FIG. 2 is a top view illustrating the embodiment of FIG. 1.

The ponds 20 and 30 shown in FIGS. 1 and 2 serve as examples of the reservoirs and relative sizes and positions contemplated. These ponds 20 and 30 can have dimensions of one hundred feet long to one, two or many miles long, and their widths can range from 100 feet to one mile or more. Furthermore, the reservoirs need not be oriented as shown in FIGS. 1 and 2, with their longitudinal axes parallel. For example, one pond can be oriented transverse to the other, depending upon the terrain. Still further, one pond can be substantially larger than the other rather than similarly sized as shown in FIGS. 1 and 2.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An improved pumped storage facility having an upper reservoir with a bank retaining water therein and a lower reservoir at different elevation than the upper reservoir, means for pumping water from the lower reservoir to the upper reservoir, and means for generating electrical power when water flows from the upper reservoir to the lower reservoir, the improvement comprising:
   (a) an outdoor seating area constructed on at least a portion of the bank of the upper reservoir facing the lower reservoir, the outdoor seating area including at least some human-seating structures;
   (b) a manmade track surface constructed around the lower reservoir, wherein at least a portion of the track surface is visible from the seating area; and
   (c) a performance area that is adjacent to the track surface and is visible from the seating area.

2. The improved pumped storage facility in accordance with claim 1, wherein the track is formed on the shore of the lower reservoir at substantially the same elevation as the performance area.

3. The improved pumped storage facility in accordance with claim 1, wherein the seating area includes a plurality of human-seating structures.

4. The improved pumped storage facility in accordance with claim 3, wherein the seating area is a length that is substantially equal to a length of the performance area.

5. The improved pumped storage facility in accordance with claim 1, further comprising a parking lot adjacent the lower reservoir, wherein the parking lot includes rainwater runoff apparatuses that direct rainwater falling on the parking lot to flow into the lower reservoir.

6. The improved pumped storage facility in accordance with claim 1, wherein the performance area is built at least in part on piers extending over the lower reservoir.

7. The improved pumped storage facility in accordance with claim 1, further comprising concession facilities constructed at least partially in the bank of the upper reservoir facing the lower reservoir.

* * * * *